US008553508B2

(12) United States Patent
Usui et al.

(10) Patent No.: US 8,553,508 B2
(45) Date of Patent: Oct. 8, 2013

(54) FOCUS SERVO CONTROL DEVICE, AND INFORMATION RECORDING/REPRODUCING DEVICE USING THE SAME

(75) Inventors: Takashi Usui, Saitama (JP); Kazuo Watabe, Yokohama (JP); Hideaki Okano, Yokohama (JP); Chikara Tanioka, Yokohama (JP); Akihito Ogawa, Fujisawa (JP); Kazuaki Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/421,503

(22) Filed: Mar. 15, 2012

(65) Prior Publication Data
US 2012/0236696 A1    Sep. 20, 2012

(30) Foreign Application Priority Data
Mar. 17, 2011    (JP) .................................. 2011-059919

(51) Int. Cl.
*G11B 7/00* (2006.01)
*G11B 5/55* (2006.01)
*G11B 5/58* (2006.01)

(52) U.S. Cl.
USPC .................. 369/44.23; 369/44.14; 369/44.25; 369/53.28; 369/53.23; 369/124.12; 369/124.15; 369/53.35

(58) Field of Classification Search
USPC .......... 369/44.11, 44.14, 44.25, 44.26, 44.34, 369/53.28, 43, 53.23, 124.12, 124.15, 44.41, 369/53.22, 53.27, 53.35, 44.23
See application file for complete search history.

(56) References Cited

U.S. PATENT DOCUMENTS

| 5,408,453 | A | 4/1995 | Holtslag et al. |
| 6,496,454 | B1 | 12/2002 | Nakano |
| 6,574,147 | B2 | 6/2003 | Tanaka et al. |
| 6,738,322 | B2 | 5/2004 | Amble et al. |
| 2008/0170481 | A1* | 7/2008 | Ogata ........................ 369/53.12 |
| 2009/0067315 | A1* | 3/2009 | Park et al. ................ 369/124.02 |
| 2010/0254233 | A1* | 10/2010 | Tsuchino et al. .......... 369/44.27 |
| 2011/0170388 | A1* | 7/2011 | Ishimoto et al. ........... 369/44.37 |

(Continued)

FOREIGN PATENT DOCUMENTS

| JP | 4-301226 | 10/1992 |
| JP | 06-131688 | 5/1994 |

(Continued)

OTHER PUBLICATIONS

Masaharu Nakano, et al., "Recording System for Multilayer Disk with a Separated Guide Layer", OSIM2009 Technical Digest, Th-I-03, Oct. 2009.

(Continued)

*Primary Examiner* — Aneeta Yodichkas
(74) *Attorney, Agent, or Firm* — Blakely, Sokoloff, Taylor & Zafman LLP

(57) ABSTRACT

A focus servo control device includes a first detector, first controller, second detector, and second controller. The first detector detects a first focus error signal. The first controller controls the objective lens based on the first focus error signal, so that a focal point of the first laser agrees with the guide layer. The second detector detects a second focus error signal. The second controller changes a relative distance between the focal point of the second laser and the focal point of the first laser, so that the focal point of the second laser agrees with a target recording/reproducing layer.

7 Claims, 7 Drawing Sheets

(56) References Cited

U.S. PATENT DOCUMENTS

2011/0242951 A1* 10/2011 Saito et al. ............. 369/44.14
2012/0120783 A1* 5/2012 Takahashi ............... 369/44.25

FOREIGN PATENT DOCUMENTS

| | | |
|---|---|---|
| JP | 3989140 | 7/2007 |
| JP | 2008-065932 | 3/2008 |
| JP | 2011-048873 | 3/2011 |

OTHER PUBLICATIONS

Japanese Patent Application No. 2011-059919, First Office Action, mailed Feb. 5, 2013, (with English Translation).

* cited by examiner

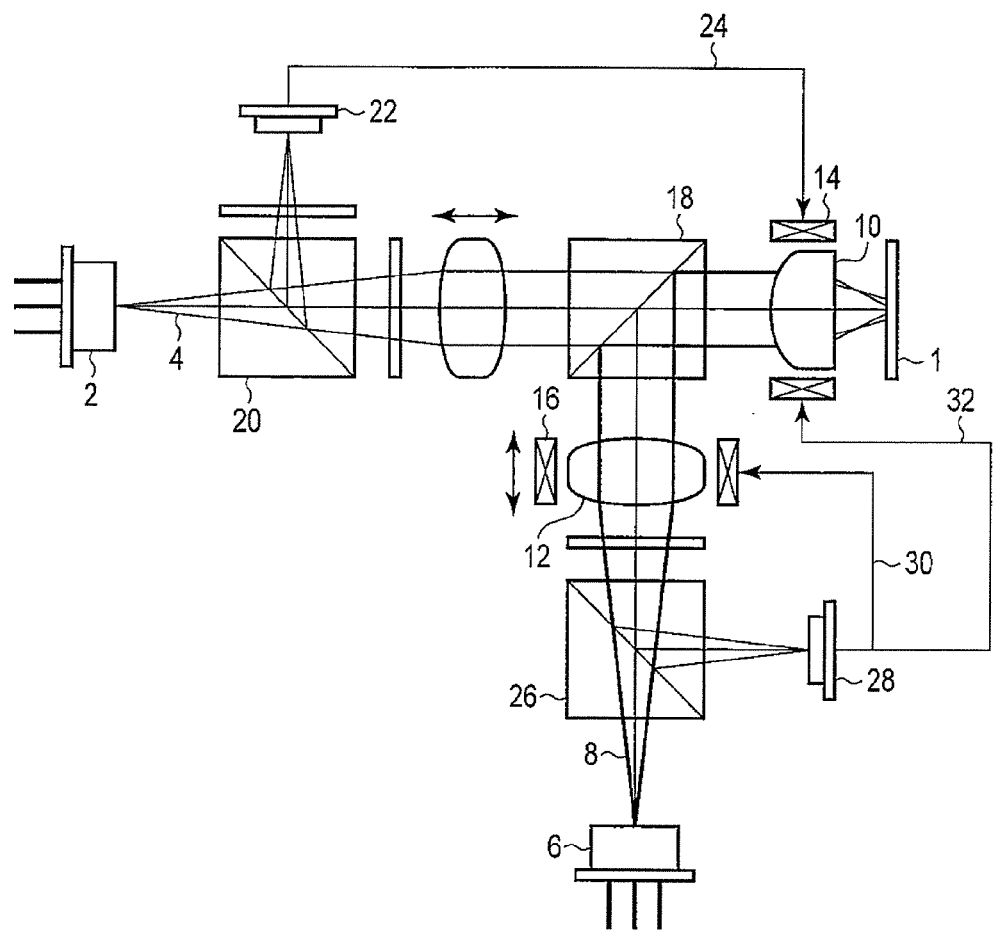
F I G. 1

US 8,553,508 B2

FOCUS SERVO CONTROL DEVICE, AND INFORMATION RECORDING/REPRODUCING DEVICE USING THE SAME

CROSS-REFERENCE TO RELATED APPLICATIONS

This application is based upon and claims the benefit of priority from prior Japanese Patent Application No. 2011-059919, filed Mar. 17, 2011, the entire contents of which are incorporated herein by reference.

FIELD

Embodiments described herein relate generally to a focus servo control device, and an information recording/reproducing device using the same.

BACKGROUND

An optical information recording medium represented by Compact Disc (CD), Digital Versatile Disc (DVD), and Blu-ray Disc (BD), etc., has responded to increase of recording density heretofore, mainly by shortening a wavelength of a laser beam and by increasing the number of aperture (NA) of an objective lens. However, it is said that all of the aforementioned methods have almost reached their limit for a technical reason, etc., and therefore increase of the recording density by other means/system, is desired. Among various proposals, in recent years, a multilayer optical disc of a guide layer system in which a guide layer having tracking servo information (groove) is provided separately from recording layers has been proposed as a multilayer optical disc with the multilayered recording layers. Thus, a structure of the laminated recording layers is simplified, and accordingly a disc manufacturing cost is expected to be reduced.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing a recording/reproducing device according to an embodiment;

DETAILED DESCRIPTION

Figure 2:
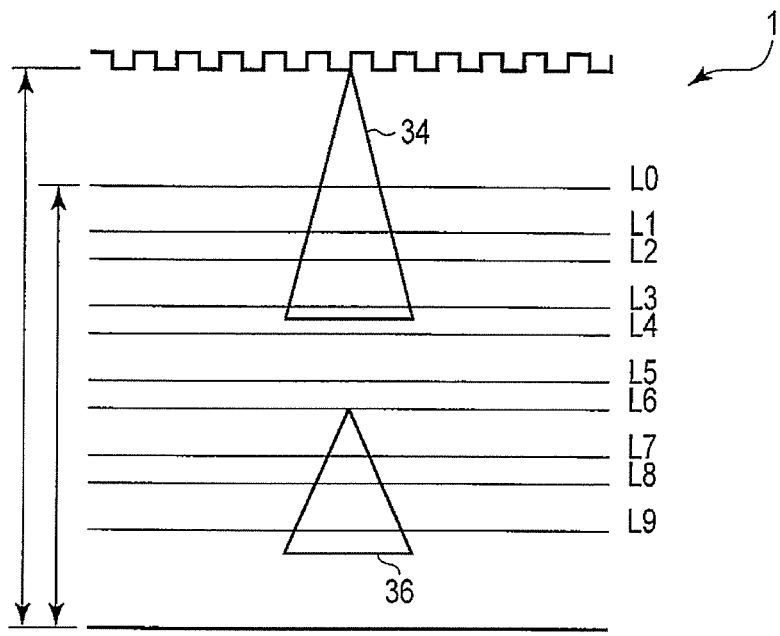
FIG. 2 is a schematic view showing a structure of a recording medium.

Various embodiments will be described hereinafter with reference to the accompanying drawings.

In general, according to one embodiment, there is provided a focus servo control device for recording information in a recording medium having a guide layer and a plurality of recording/reproducing layers, or for reproducing the information from the recording medium. This device includes a first detector, a first controller, a second detector, and a second controller. The first detector is configured to detect a first focus error signal based on a reflected light reflected when the guide layer is irradiated with a first laser for focus servo through an objective lens. The first controller is configured to control the objective lens based on the first focus error signal, so that a focal point of the first laser agrees with the guide layer. The second detector is configured to detect a second focus error signal based on a reflected light reflected when the recording layers are irradiated with a second laser for recording/reproducing through the objective lens. The second controller is configured to change a relative distance between the focal point of the second laser and the focal point of the first laser based on the second focus error signal, so that the focal point of the second laser agrees with a target recording/reproducing layer.

This embodiment relates to a device and a method of focus servo control applied to overall information recording devices using a guide layer system, which performs recording/reproducing operation to an optical recording medium having recording layers and a guide layer. An outline of a structure of the recording/reproducing device according to this embodiment is shown in FIG. 1. The recording/reproducing device according to this embodiment is a device configured to carry out recording or reproducing operation of information to a recording medium 1. This device functions as a light pick optical system including a focus servo control mechanism, and includes a laser diode (blue) 2, a laser diode (red) 6, an objective lens 10, a collimator lens 12, an objective lens actuator 14, a collimator lens actuator 16, a dichroic prism 18, a polarized beam splitter (PBS) 20, a photo detector IC (PDIC) 22, a polarized beam splitter (PBS) 26, and a photo detector IC (PDIC) 28, as shown in FIG. 1.

Blue laser light 4 generated by the laser diode 2, is incident on the recording medium 1 through the polarized beam splitter (PBS) 20, the dichroic prism 18, and the objective lens 10. A reflected light from the recording medium 1 passes through a route reverse to an incident route, and is detected by the photo detector IC (PDIC) 22 through the polarized beam splitter (PBS) 20. The photo detector IC (PDIC) 22 carries out an operation of focus servo control that will be described later, and outputs a focus error signal 24. The focus error signal 24 is input into the objective lens actuator 14, and the objective lens 10 is controlled to be driven according to the signal 24. Thus, a focal position, etc., of the blue laser incident on the recording medium 1 is changed.

On the other hand, red laser light 8 generated by the laser diode 6 is incident on the recording medium 1 through the polarized beam splitter (PBS) 26, the dichroic prism 18, and the objective lens 10. The reflected light from the recording medium 1 passes through the route reverse to the incident route, and is detected by the photo detector IC (PDIC) 28 through the polarized beam splitter (PBS) 26. The photo detector IC (PDIC) 28 carries out an operation of tracking servo in addition to focus servo control that will be described later, and outputs a focus error signal 30 and a tracking error signal 32. The focus error signal 30 is input into the collimator lens actuator 16, and the collimator lens 12 is controlled to be driven according to the signal 30. Thus, the focal position, etc., of the red laser incident on the recording medium 1 is changed.

In a conventional system, which is not the guide layer system, of a optical disk medium such as Digital Versatile Disk (DVD) and Blu-ray Disk (BD), a plurality of recording layers having a groove for tracking are laminated to form a multilayer structure. In BD-R, the multilayer up to four layers is standardized, but when five layers or more are multilayered, a disk manufacturing cost is increased because of existence of groove information in each layer, and the interests of a user is impaired.

Meanwhile, in a multilayer medium (recording medium 1) of the guide layer system used in the recording/reproducing device according to this embodiment, the guide layer having the groove is provided separately from the recording layers. Thus, it is considered that the structure of the laminated recording layers themselves can be simplified, and the disk manufacturing cost can be reduced. The structure of the recording medium 1 is shown in FIG. 2. As shown in FIG. 2, one guide layer and a plurality of recording layers (L0 to L9) are formed in the recording medium 1. A guide light 34 is focused on the guide layer, and a recording light 36 is focused on the recording layers (L0 to L9).

[Focus Lock]

Figure 3:
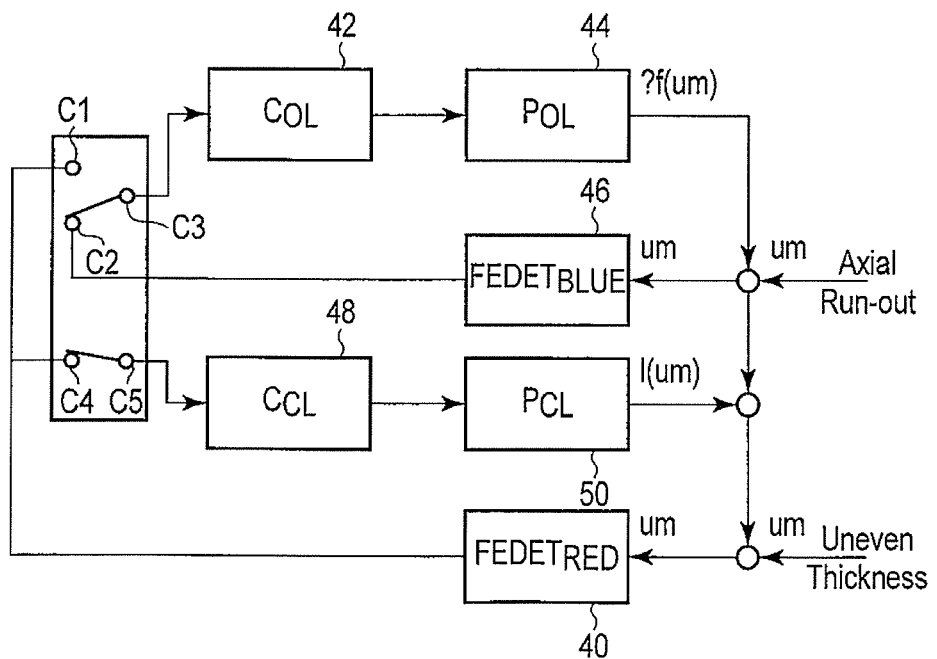
FIG. 3 is a block diagram showing a control structure according to an embodiment.

A structure for realizing a focus locking control according to this embodiment is shown in FIG. 3. Basically, a recording/reproducing operation is carried out using the blue laser, and servo is applied to the guide layer using the red laser.

As described above, in the structure of this embodiment, two actuators for driving a lens are provided. One of the actuators is an objective lens actuator 14 for driving an objective lens 10, and the other actuator is a collimator lens actuator 16 provided in an optical path of the red laser. When the objective lens 10 is driven by the objective lens actuator 14, focal positions of both blue and red laser lights are moved. Further, when a collimator lens 12 is driven by the collimator lens actuator 16, the focal position of the red laser light is moved.

The focus error signal is obtained from each of the recording layers in which recording or reproducing is carried out using the blue laser and the guide layer in which reproducing is carried out using the red laser. Two actuators, namely, the objective lens actuator 14 and the collimator lens actuator 16 are individually controlled according to each focus error signal.

In FIG. 3, for example, the tracking error signal at recording time is obtained from the guide layer by $FEDET_{RED}$ 40 (corresponding to PDIC 28 of FIG. 1), and in accordance with this signal, $C_{OL}$ 42 (corresponding to objective lens actuator 14 of FIG. 1) performs control to drive $P_{OL}$ 44 (corresponding to the objective lens 10 of FIG. 1). In this case, contact point C1 and contact point C3 are connected to each other. On the other hand, the tracking error signal at reproducing time is obtained from the recording layers by $FEDET_{BLUE}$ 46 (corresponding to PDIC 22 of FIG. 1), and in accordance with this signal, $C_{OL}$ 42 (corresponding to the objective lens actuator 14 of FIG. 1) performs control to drive $P_{OL}$ 44 (corresponding to the objective lens 10 of FIG. 1). In this case, contact point C2 and contact point C3 are connected to each other.

Figure 4:
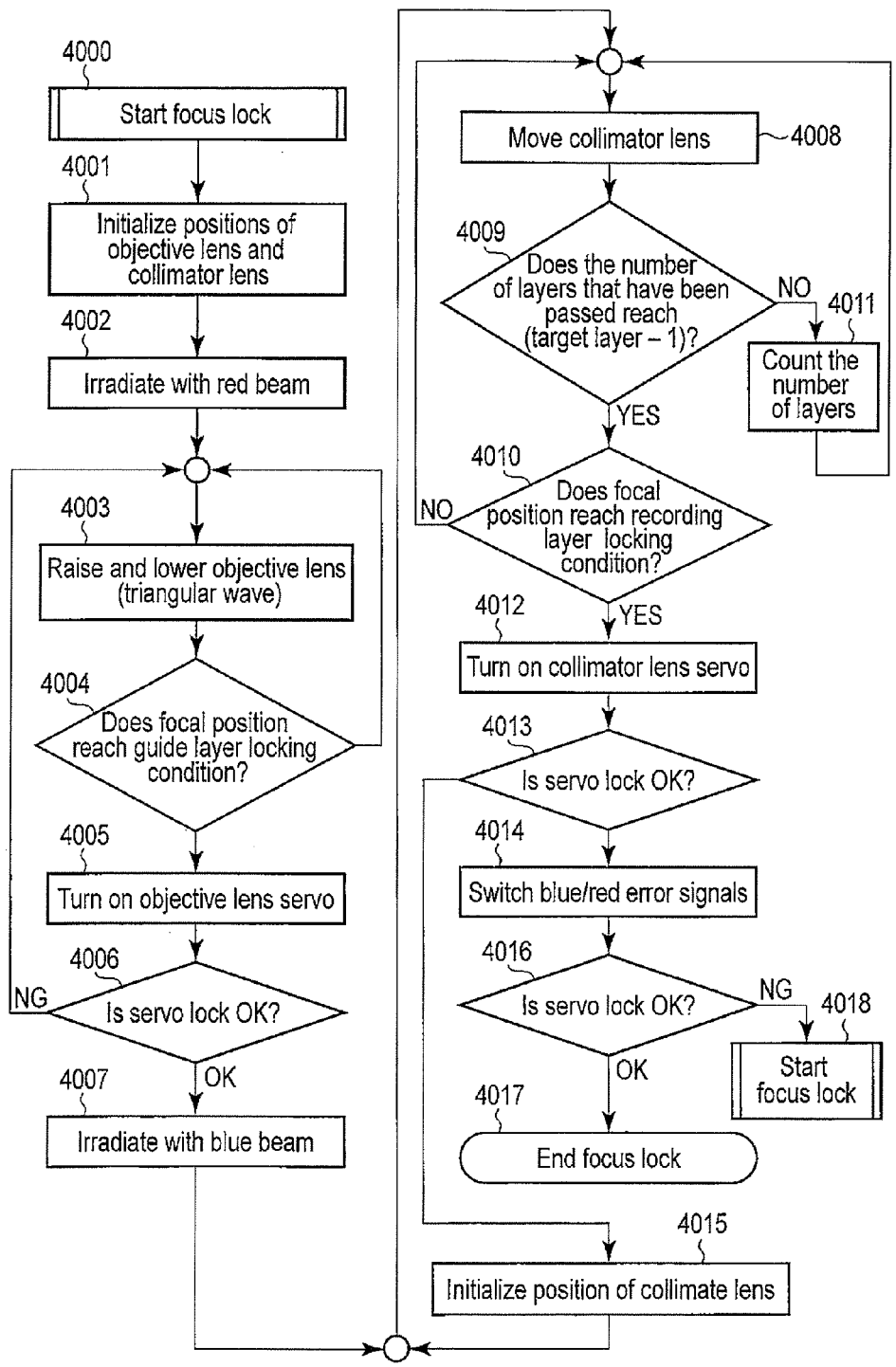
FIG. 4 is a flowchart showing a focus locking procedure according to a first embodiment.
Figure 5:
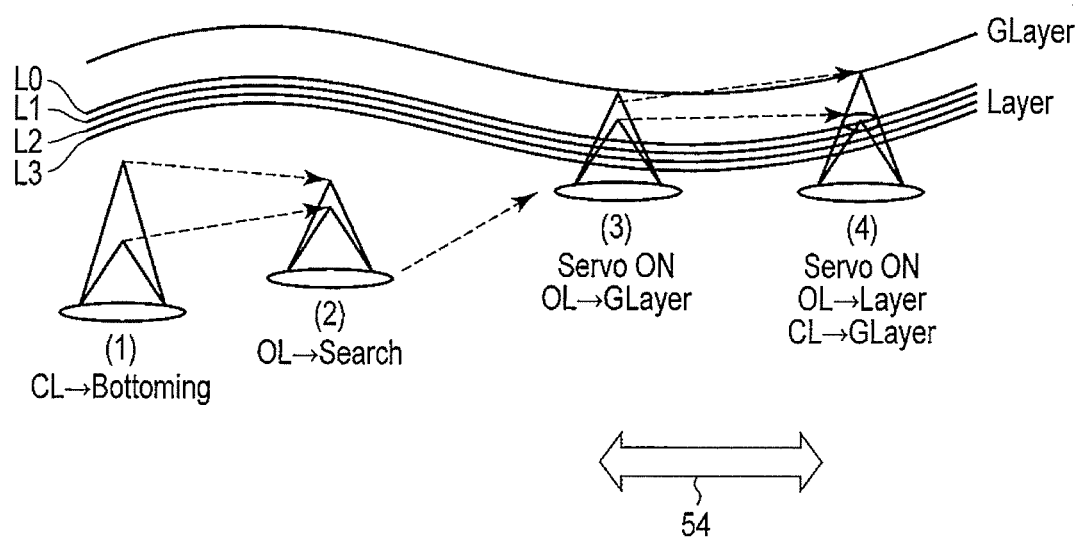
FIG. 5 is a schematic view of the focus locking procedure.

The focus locking procedure in a case of focusing on L0 layer (layer farthest from an incident surface) in the recording medium 1 having one guide layer and ten recording layers will be described according to a flowchart of FIG. 4. Further, FIG. 5 is a schematic view of the focus locking procedure.

In steps 4000 to 4001, the collimator lens 12 is moved in a direction in which the focal distances of the red laser and the blue laser come closest to each other. This state is shown in FIG. 5(1). The objective lens 10 is moved to a lowermost end (or an uppermost end). In steps 4002 to 4003, the objective lens actuator 14 is driven by a triangular wave. At this time, the recording medium 1 is set in a state of being irradiated with at least the red laser. This state is shown in FIG. 5(2).

In steps 4004 to 4006, the focal point of the red laser is controlled to be locked to the guide layer. Specifically, the focus error signal (S-shape) which crosses zero at the moment when the focal position of the red laser passes the guide layer of the disk, and a focus sum signal corresponding to the intensity of the reflected light, are acquired, and the focus servo is turned on using the objective lens actuator 14 in accordance with a prescribed locking sequence. In the locking sequence, for example, the focus servo is turned on at the moment when the focus sum signal exceeds a certain threshold value, and a derivative value of the focus error signal exceeds a certain threshold value. At this time, it is not necessarily required to be successful in the focus lock at a first cross point, and the focus locking operation may be performed in a stage when a relative speed is reduced at a later time. FIG. 5(3) shows a state in which the focus servo for the guide layer is turned on using the objective lens actuator 14 under irradiation of the red laser.

In steps 4007 to 4008, the recording medium 1 is irradiated with the blue laser. Further, the collimator lens 12 is moved at a constant speed in a direction in which the focal distances of the red laser and the blue laser are away from each other (FIG. 5(3)). At this time, the number of layers that have been passed is counted starting from zero, based on the reflected light from the recording layer irradiated with the blue laser. The exact number of the layers can be counted by driving the collimator lens to move at a sufficiently slower speed than a moving speed of the focal position moved by the triangular wave for driving the objective lens.

In steps 4009 to 4013, the focal point of the blue laser is controlled to be locked to a target recording layer when an arrival at the target layer is judged based on the aforementioned count of the number of the layers (L0 layer is the target layer and therefore the first layer is the target layer this time). Specifically, the focus error signal (S-shape) which crosses zero at the moment when the focal position of the blue laser passes the guide layer of the disk, and the focus sum signal corresponding to the intensity of the reflected light, are acquired, and the focus servo is turned on using the collimator lens actuator 16 in accordance with a prescribed locking sequence. In the locking sequence, for example, the focus servo is turned on, at the moment when the focus sum signal exceeds a certain threshold value and a derivative value of the focus error signal exceeds a certain threshold value.

In this stage, the objective lens actuator 14 performs servo operation so that the red laser follows the guide layer, and the collimator lens actuator 16 performs servo operation so that the blue laser follows the recoding layers. The focus servo for the recording layers is desired to follow in a higher control band of the recording layers. When a servo band of the objective lens actuator 14 is higher than a servo band of the collimator lens 12, error signals to be input to these two actuators are preferably switched, together with a proper gain.

Therefore, in steps 4014 to 4018, the error signal of the blue laser and the error signal of the red laser are mutually switched. Thus, the objective lens actuator 14 can perform servo operation so that the blue laser follows the recording layers, and the collimator lens actuator 16 can perform servo operation so that the red laser follows the guide layer. This state is shown in FIG. 5(4).

By performing focus locking operation in accordance with the aforementioned procedure, the objective lens 10 can always follow the plane wobbling even in a period 54 in which the recording layers are searched. Accordingly, there is no necessity for considering a change of the relative speed caused by the plane wobbling, and a stable locking performance can be achieved by counting exact number of the layers.

Figure 6A:
FIG. 6A and FIG. 6B are graphs showing simulation waveforms of a comparative example and this embodiment, regarding the focus lock under the same plane wobbling condition.
Figure 6B:
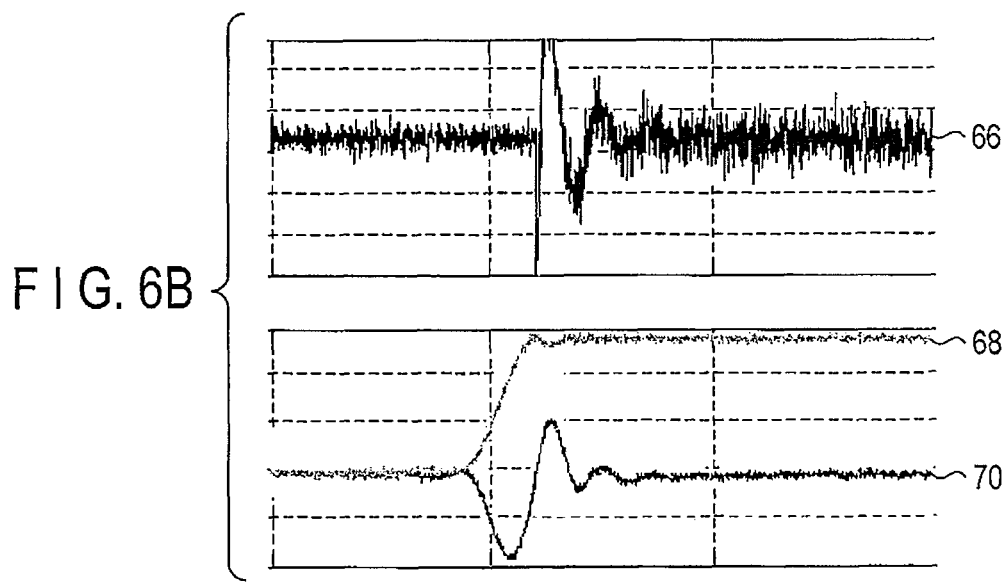

FIG. 6A and FIG. 6B show simulation waveforms of a comparative example and this embodiment, regarding the focus lock under the same plane wobbling condition. FIG. 6A corresponds to the comparative example, and FIG. 6B corresponds to this embodiment. In FIG. 6A and FIG. 6B, reference numerals 60 and 66 indicate drive signal waveforms, 62 and 68 indicate focus sum signals, and 64 and 70 indicate focus error signals. As is clarified from FIG. 6A, in the comparative example, it is found that the focus cannot be locked and passes the layers at the timing when the focus servo is turned on, and the focus is locked to a fourth layer (fourth peak of the sum signal) from a target layer. On the other hand, as is clarified from FIG. 6B, in this embodiment, focus is locked to the target layer without delay, at the timing when the focus servo is turned on.

According to this embodiment described above, overhead of moving to a target layer due to repetition of layer jump can be avoided when the focus is locked to an unintended layer, while avoiding a locking failure due to the plane wobbling of the recording medium. Accordingly, the focus locking operation of a multilayer medium can be performed at high speed.

Second Embodiment

The layer jump can be executed based on the completely same concept as the concept of the aforementioned focus locking system, in terms of searching a layer position. A basic structure of the recording/reproducing device and a basic structure of the focus locking control are the same as those of the first embodiment, and therefore explanation is omitted here, and a layer jump according to the second embodiment will be described here in detail.

[Layer Jump at Recording Time]

Figure 7:
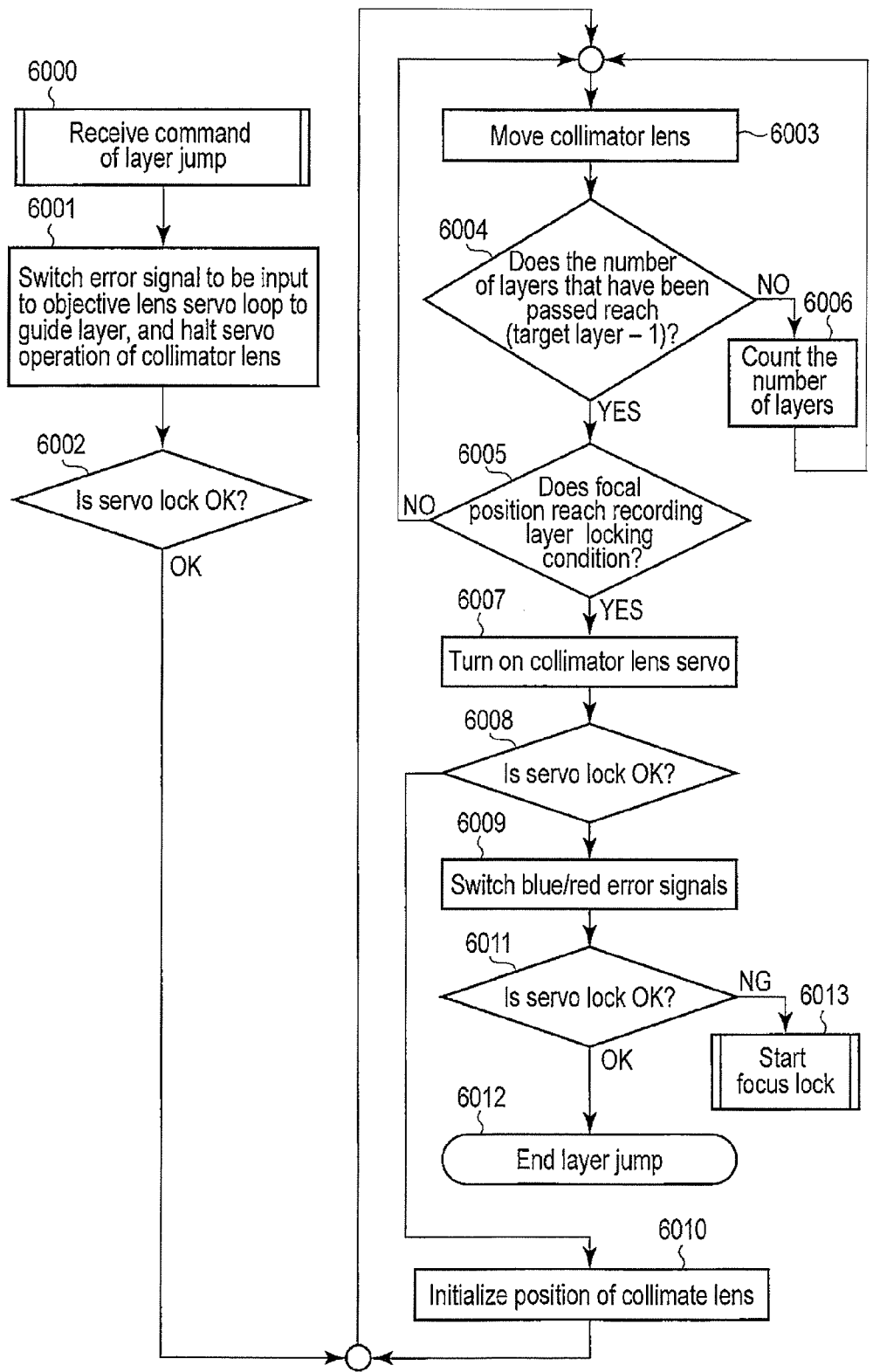
FIG. 7 is a flowchart showing a layer jump procedure at recording time according to a second embodiment.

FIG. 7 shows a layer jump procedure in a case of carrying out a layer jump from L0 layer (layer farthest from an incident surface) to L1 layer (layer precedent by one from L0 layer) at recording time, in the recording medium having one guide layer and ten recording layers. At recording time, an operation is started from a state in which the objective lens servo follows the recording layers, and the collimator lens servo follows the guide layer.

In step 6000, a command of layer jump is received from a host CPU, in a state in which the objective lens servo follows the recording layers, and the collimator lens servo follows the guide layer.

In step 6001, the focus error signal input to an objective lens servo loop is switched to the error signal obtained from the guide layer. At this time, the operation of the collimator lens servo is halted.

In step 6002, whether the objective lens servo is normally operated is confirmed.

In step 6003, the collimator lens 12 is moved at a constant speed in a direction in which the focal distances of the red laser and the blue laser come close to each other. At this time, the number of the layers that have been passed is counted starting from zero, based on the reflected light from the recording layer irradiated with the blue laser. The exact number of the layers can be counted by driving the collimator lens to move at a sufficiently slower speed than a moving speed of the focal position moved by the triangular wave for driving the objective lens.

In steps 6004 to 6007, the focal point of the blue laser is controlled to be locked to a target recording layer when an arrival at the target layer is judged based on the count of the number of the layers (this time, a start layer is L0, and a target layer is the adjacent L1 layer, and therefore the first layer is the target layer). Specifically, the focus error signal (S-shape) which crosses zero at the moment when the focal position of the blue laser passes the guide layer of the disk, and the focus sum signal corresponding to the intensity of the reflected light, are acquired, and the focus servo is turned on using the collimator lens actuator 16 in accordance with a prescribed locking sequence. For example, the focus servo is turned on at the moment when the focus sum signal exceeds a certain threshold value and a derivative value of the focus error signal exceeds a certain threshold value.

In this stage, the objective lens actuator 14 performs servo operation so that the red laser follows the guide layer, and the collimator lens actuator 16 performs servo operation so that the blue laser follows the recoding layers. The focus servo for the recording layers is desired to follow in a higher control band of the recording layers. When the servo band of the objective lens actuator 14 is higher than the servo band of the collimator lens 12, error signals to be input to these two actuators are preferably switched, together with a proper gain. Therefore, in steps 6008 to 6013, the error signal of the blue laser and the error signal of the red laser are mutually switched. Thus, the objective lens actuator 14 can perform servo operation so that the blue laser follows the recording layers, and the collimator lens actuator 16 can perform servo operation so that the red laser follows the guide layer.

By following the aforementioned procedure, the objective lens 10 can always follow the plane wobbling, and a stable movement (layer jump) between the recording layers can be performed by counting the exact number of the layers, without necessity for considering the change of the relative speed caused by the plane wobbling.

Third Embodiment

In the aforementioned second embodiment, the layer jump at recording time is described. In the third embodiment, the layer jump at reproducing time will be described. Similarly to the second embodiment, the basic structure of the recording/reproducing device and the basic structure of the focus locking control are the same as those of the first embodiment, and therefore explanation is omitted.

[Layer Jump at Reproducing Time]

Figure 8:
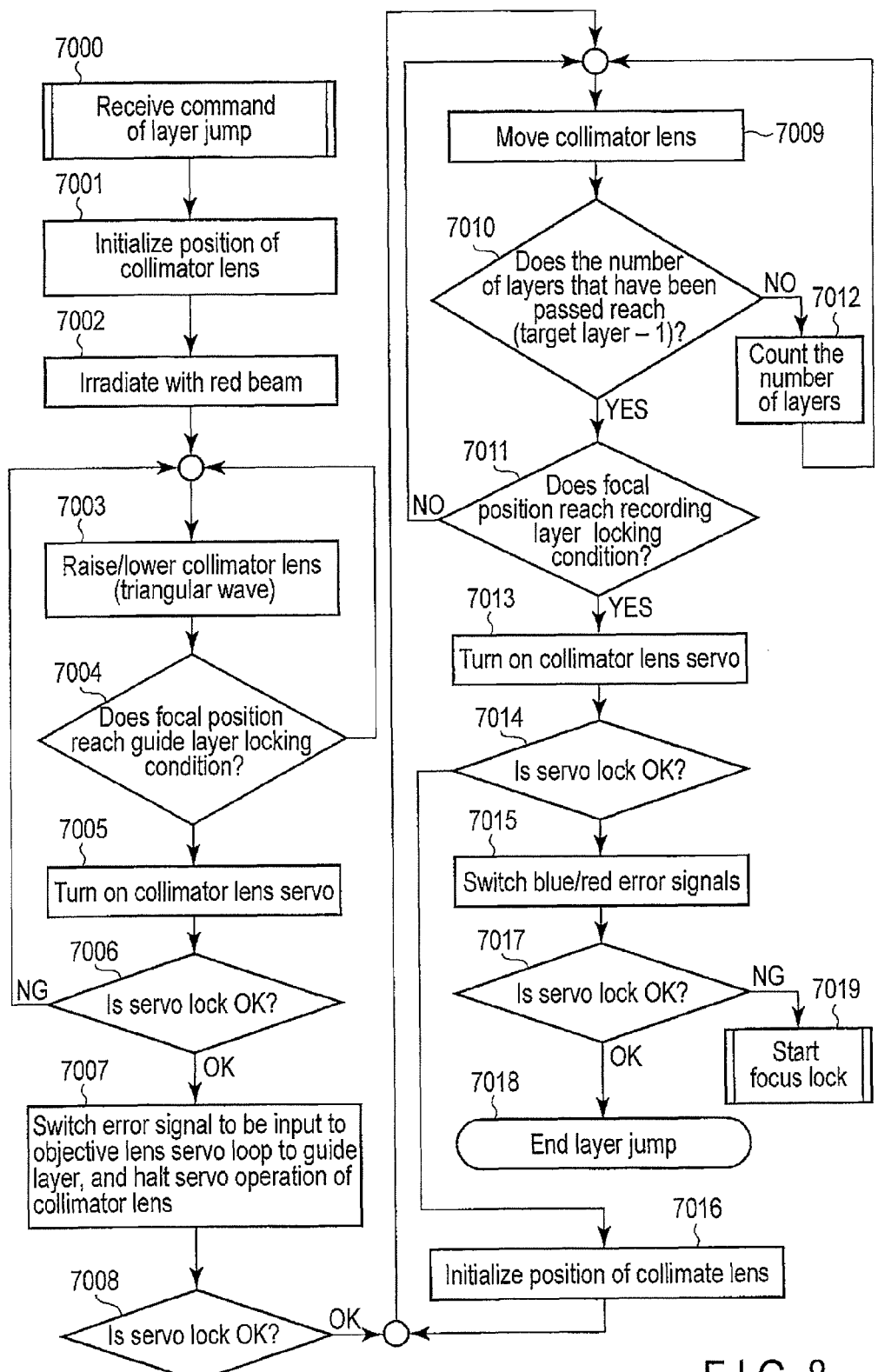
FIG. 8 is a flowchart showing a layer jump procedure at reproducing time according to a third embodiment.

FIG. 8 shows a layer jump procedure in a case of carrying out a layer jump from L0 layer (layer farthest from the incident surface) to L1 layer (layer precedent by one from L0 layer) at reproducing time, in the medium having one guide layer and ten recording layers. At reproducing time, a layer jump is started from a state in which only the objective lens servo follows the recording layers, and the collimator lens 12 is not operated.

In step 7000, the command of layer jump is received from the host CPU, in a state in which only the objective lens servo follows the recording layers, and the collimator lens 12 is not operated.

In step 7001, the collimator lens 12 is moved in a direction in which the focal distances of the red laser and the blue laser come closest to each other.

In steps 7002 to 7003, the collimator lens actuator 16 is driven by the triangular wave. At this time, the red laser is set in an irradiation state.

In steps 7004 to 7006, the focal point of the red laser is controlled to be locked to the guide layer. Specifically, the focus error signal (S-shape) which crosses zero at the moment when the focal position of the red laser passes the guide layer of the disk, and the focus sum signal corresponding to the intensity of the reflected light, are acquired, and the focus servo is turned on using the collimator lens actuator 16 in accordance with a prescribed locking sequence. For example, the focus servo is turned on at the moment when the focus sum signal exceeds a certain threshold value and a derivative value of the focus error signal exceeds a certain threshold value. Locking control is performed in such a procedure. At this time, it is not necessarily required to be successful in the focus lock at a first cross point, and the focus locking operation may be performed in a stage when a relative speed is reduced at a later time.

In step 7007, the focus error signal input to the objective lens servo loop is switched to the error signal obtained from the guide layer. At this time, the operation of the collimator servo is halted once.

In step 7008, whether the objective lens servo is normally operated is confirmed.

In step 7009, the collimator lens 12 is moved at a constant speed in a direction in which the focal distances of the red laser and the blue laser come close to each other. At this time, the number of the layers that have been passed is counted starting from zero, based on the reflected light from the recording layer irradiated with the blue laser. The exact number of the layers can be counted by driving the collimator lens to move at a sufficiently slower speed than a moving speed of the focal position moved by the triangular wave for driving the objective lens.

In steps 7010 to 7014, the focal point of the blue laser is controlled to be locked to a target recording layer when an arrival at the target layer is judged based on the count of the number of the layers (this time, a start layer is L0, and a target layer is the adjacent L1 layer, and therefore the first layer is the target layer). Specifically, the focus error signal (S-shape) which crosses zero at the moment when the focal position of the blue laser passes the guide layer of the disk, and the focus sum signal corresponding to the intensity of the reflected light, are acquired, and the focus servo is turned on using the collimator lens actuator 16 in accordance with a prescribed locking sequence. For example, the focus servo is turned on at the moment when the focus sum signal exceeds a certain threshold value and a derivative value of the focus error signal exceeds a certain threshold value.

In this stage, the objective lens actuator 14 performs servo operation so that the red laser follows the guide layer, and the collimator lens actuator 16 performs servo operation so that the blue laser follows the recoding layers. The focus servo for the recording layers is desired to follow in a higher control band the recording layers. When the servo band of the objective lens actuator 14 is higher than the servo band of the collimator lens 12, error signals to be input to these two actuators are preferably switched, together with a proper gain. Therefore, in steps 7015 to 7019, the error signal of the blue laser and the error signal of the red laser are mutually switched. Thus, the objective lens actuator 14 can perform servo operation so that the blue laser follows the recording layers, and the collimator lens actuator 16 can perform servo operation so that the red laser follows the guide layer.

By following the aforementioned procedure, also at reproducing time, the objective lens 10 can always follow the plane wobbling, and a stable movement (layer jump) between the recording layers can be performed by counting the exact number of the layers, without necessity for considering the change of the relative caused by the plane wobbling.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A focus servo control device for recording information in a recording medium having a guide layer and a plurality of recording/reproducing layers, and reproducing the information from the recording medium, comprising:
    a first detector configured to detect a first focus error signal based on a reflected light reflected when the guide layer is irradiated with a first laser for focus servo through an objective lens;
    a first controller configured to control the objective lens based on the first focus error signal, so that a focal point of the first laser agrees with the guide layer;
    a second detector configured to detect a second focus error signal based on a reflected light reflected when the recording layer is irradiated with a second laser for a recording/reproducing through the objective lens;
    a second controller configured to change a relative distance between the focal point of the second laser and the focal point of the first laser based on the second focus error signal, so that the focal point of the second laser agrees with a target recording/reproducing layer in the recording/reproducing layers; and
    a switcher configured to switch the first focus error signal and the second focus error signal mutually between each other at a timing when the focal point of the first laser substantially agrees with the guide layer and the focal point of the second laser substantially agrees with the target recording/reproducing layer, so that the first focus error signal is input to the second controller and the second focus error signal is input to the first controller,
    wherein after the first focus error signal and the second focus error signal are switched, the first controller controls the focal point of the second laser based on the second focus error signal, so that the focal point of the second laser agrees with the target recording/reproducing layer in the recording/reproducing layers.

2. The device according to claim 1, wherein the second controller comprises:
    an initializing module configured to perform lens driving operation for initializing the relative distance; and
    a driving module configured to perform lens driving operation that changes the relative distance for searching a focusing position of the second laser.

3. The device according to claim 1, wherein the second controller is configured to change the relative distance so that the focal point of the second laser agrees with the target recording/reproducing layer in the plurality of recording/reproducing layers, after focus servo of the objective lens is started by the first controller so that the focal point of the first laser agrees with the guide layer.

4. The device according to claim 1, wherein the second controller is configured to change a relative distance between the focal point of the second laser and the focal point of the first laser based on the second focus error signal, for moving the focal point of the second laser to a second target recording/reproducing layer from a first target recording/reproducing layer in the plurality of recording/reproducing layers.

5. The device according to claim 1, wherein the switcher is switching circuitry implemented within the second controller.

6. A recording/reproducing device for recording information in a recording medium having a guide layer and a plurality of recording/reproducing layers, or reproducing the information from the recording medium, comprising:

an objective lens:

a first detector configured to detect a first focus error signal based on a reflected light reflected when the guide layer is irradiated with a first laser for focus servo through the objective lens;

a first controller configured to control the objective lens based on the first focus error signal, so that a focal point of the first laser agrees with the guide layer;

a second detector configured to detect a second focus error signal based on a reflected light reflected when the recording layer is irradiated with a second laser for recording/reproducing through the objective lens;

a second controller configured to change a relative distance between the focal point of the second laser and the focal point of the first laser based on the second focus error signal, so that the focal point of the second laser agrees with a target recording/reproducing layer in the plurality of recording/reproducing layers; and a switcher configured to switch the first focus error signal and the second focus error signal mutually between each other at a timing when the focal point of the first laser substantially agrees with the guide layer and the focal point of the second laser substantially agrees with the target recording/reproducing layer, so that the first focus error signal is input to the second controller and the second focus error signal is input to the first controller, wherein after the first focus error signal and the second focus error signal are switched, the first controller controls the focal point of the second laser based on the second focus error signal, so that the focal point of the second laser agrees with the target recording/reproducing layer in the recording/reproducing layers.

7. The device according to claim 6, wherein the switcher is switching circuitry implemented within the second controller.

* * * * *